United States Patent
Frazier et al.

(10) Patent No.: US 6,297,765 B1
(45) Date of Patent: Oct. 2, 2001

(54) BISTATIC PASSIVE RADAR SYSTEM WITH IMPROVED RANGING

(75) Inventors: Lawrence M. Frazier, West Covina; Benjamin G. Lewis, Corona, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 06/304,458

(22) Filed: Sep. 22, 1981

Related U.S. Application Data (63) Continuation-in-part of application No. 06/112,776, filed on Jan. 17, 1980, now abandoned.

(51) Int. Cl.$^7$ .................................................. G01S 13/08
(52) U.S. Cl. ........................... 342/133; 342/147; 342/176
(58) Field of Search ................... 343/5 EM, 7.4, 343/7 A, 451, 458; 364/458, 460; 342/133, 147, 176

(56) References Cited

U.S. PATENT DOCUMENTS

| | | | |
|---|---|---|---|
| 2,639,422 | * 5/1953 | Harris | 343/11 |
| 2,931,032 | 3/1960 | Newhouse | 343/119 |
| 2,979,718 | 4/1961 | Newhouse et al. | 343/119 |
| 3,038,122 | 6/1962 | Tollefson et al. | 328/137 |
| 3,218,642 | 11/1965 | Newhouse et al. | 343/114.5 |
| 3,333,264 | 7/1967 | Knepper | 343/12 |
| 3,369,241 | 2/1968 | Newhouse et al. | 343/119 |
| 3,487,462 | 12/1969 | Holberg | 343/12 |
| 3,613,095 | 10/1971 | Elwood | 343/112 |
| 3,646,556 | 2/1972 | Bishop | 343/6.5 R |
| 3,653,048 | 3/1972 | Steinhauser | 343/112 |
| 3,720,945 | 3/1973 | Chow et al. | 343/114.5 |
| 3,720,946 | 3/1973 | Chow et al. | 343/119 |
| 3,812,493 | 5/1974 | Afendykiw et al. | 343/12 R |
| 3,825,928 | 7/1974 | Williams | 343/5 R |
| 3,842,417 | 10/1974 | Williams | 343/5 R |
| 3,939,475 | 2/1976 | Lewis | 343/12 R |
| 3,978,482 | 8/1976 | Williams et al. | 343/11 R |
| 4,084,160 | 4/1978 | Leuenberger et al. | 343/16 M |
| 4,203,115 | 5/1980 | Hannigan | 343/112 R |
| 4,224,618 | 9/1980 | Rich et al. | 343/5 EM |
| 4,370,656 | * 1/1983 | Frazier et al. | 343/458 |

* cited by examiner

*Primary Examiner*—Theodore M. Blum
(74) *Attorney, Agent, or Firm*—David W. Collins; Andrew J. Rudd; Glenn H. Lenzen, Jr.

(57) ABSTRACT

A bistatic passive radar system having a display; a first directional antenna for determining the angle between the reference azimuth of the bistatic passive radar system and the line of sight to a host transmitter; an omnidirectional antenna for receiving reflected radar pulses from targets at any bearing; and a second directional antenna for determining the angle B between the line of sight to the host transmitter and a second line which extends from the bistatic passive radar system to a selected target. The angle of the second directional antenna is indicated by a B cursor on the display. The system includes a bistatic range correction circuit that utilizes an empirical determination of the distance D between the bistatic passive radar system and the host transmitter for determining the correct range for display of a selected target. The distance D is manually varied on the display until the B cursor on the display bisects the video image of a selected target toward which the second directional antenna is pointing. This technique is applicable for all targets and receivers that lie in the plane of rotation of the host radar.

17 Claims, 4 Drawing Sheets

– – – – POSITION OF B CURSOR WITH D SET TO ZERO
– – – – – – SUCCESSIVE INTERIM POSITIONS OF B CURSOR
———— CORRECT POSITION OF B CURSOR
– – – — POSITION OF B CURSOR WITH D OVERSHOT
⊙ INTERIM & OVERSHOT POSITIONS OF VIDEO IMAGE OF TARGET
• FINAL & CORRECT POSITION OF VIDEO IMAGE OF TARGET

BISTATIC PASSIVE RADAR SYSTEM WITH IMPROVED RANGING

CROSS REFERENCE TO RELATED APPLICATION

This application is a continuation-in-part of application Ser. No. 112,776 filed Jan. 17, 1980, now abandoned.

BACKGROUND OF THE INVENTION

This invention relates to improvements in bistatic passive radar systems. In ordinary (monostatic) radar systems, the radar transmitter and radar receiver are located at the same site. The transmitter emits pulses of electromagnetic energy which travel through space to electrically conductive targets and are reflected back from the targets to the receiver. The range of the targets is determined by the time it takes the pulse of electromagnetic energy to travel from the transmitter to the target and then back to the receiver. The bearing of the target is determined by focusing the transmitted pulse in a narrow beam and relatively slowly scanning the beam over the area to be searched. Thus, the bearing of the target is the same as the bearing of the antenna at the time the reflected pulse is received.

Monostatic radar has a serious disadvantage when used on military aircraft and ships in that the presence and bearing of the aircraft or ship can be detected at relatively long range (hundreds of miles) by detecting the electromagnetic pulses emitted by the radar transmitter. To overcome this disadvantage, bistatic passive radar systems were developed.

Typical prior art bistatic passive radar systems have two receivers but no transmitter. Instead of using a transmitter to illuminate the target, bistatic passive radar systems utilize the radar illumination provided by any monostatic radar transmitter within the search range of the bistatic passive radar system. One receiver of the bistatic passive radar system locks onto the host transmitter's pulse train, measures the angle between its own azimuth reference and the line of sight to the host transmitter, and determines the host transmitter's scan rate. From these data, a plan position indicator (PPI) display is generated. The other receiver of the bistatic passive radar system picks up target reflections from the host transmitter and displays them on the PPI display. Thus a display of targets is generated without emission of any appreciable levels of electromagnetic energy from the bistatic passive radar. Therefore, the bistatic passive radar system cannot be detected from a distance by its radiation.

Targets appear at their proper bearing from the transmitter on the PPI display of a bistatic passive radar system, but the accuracy of their range is dependent on accurate measurement of the distance D between the host transmitter and the bistatic passive radar system. In the past, however, there has not been any means for actually measuring the distance D between the host transmitter and the bistatic passive radar system except when the position of both were known. Therefore, the distance D between the host transmitter and the bistatic passive radar system usually was estimated. This estimation may be accurate in cases where landmarks are present on the PPI display, and map overlays can be used to estimate the position of the host transmitter, or in cases where the position of the host transmitter is known. But in deep ocean situations, where there are no landmarks, and where the host transmitter may be an enemy surface vessel, the estimated range of the host transmitter may be grossly inaccurate and therefore the range of the targets on the PPI display of the bistatic passive radar system would also be grossly inaccurate, although their bearings in relation to the position of the host transmitter would be correctly displayed.

The principal object of this invention is to provide a system for accurately determining the range of selected targets from the host transmitter without landmarks or other clues as to the position of the host transmitter so that the bistatic passive radar system can be successfully employed in deep ocean situations or in similar situations where no landmarks exist to locate the position at the host transmitter. When multiple targets at different ranges and bearings exist, the presention invention provides increased accuracy through integration of solutions for the same distance D.

SUMMARY OF THE INVENTION

Figure 1:
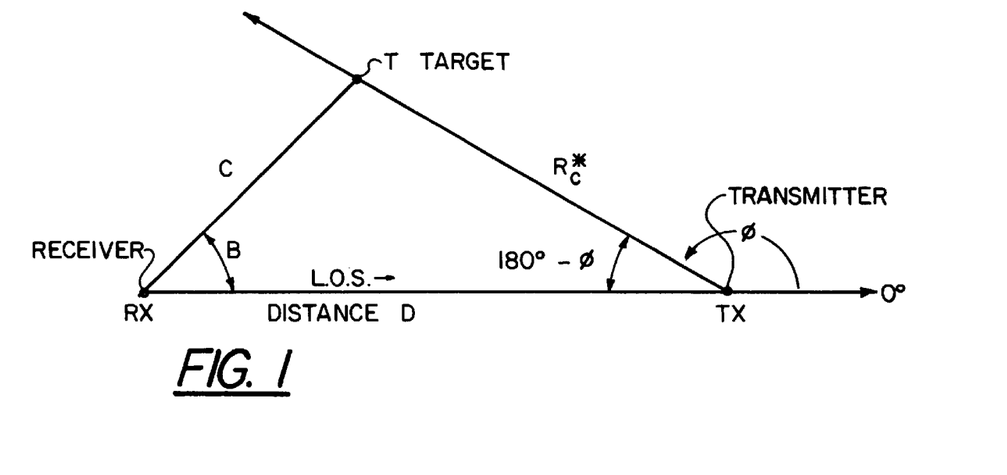
FIG. 1 is a diagram showing the geometric relationship between a bistatic passive radar system, the host transmitter, and a selected target.

In accordance with the present invention, a bistatic passive radar system which is used in conjunction with a host transmitter, and which includes a display and means for determining the azimuth angle $\theta$ between the extension of the line of sight to the host transmitter and a line extending from the host transmitter to a selected target, and also includes means for determining the apparent range $R_a$ of the selected target, is characterized by apparatus for determining the angle B between the line of sight to the host transmitter and a line extending from the bistatic passive radar system to the selected target; and apparatus for determining the distance between the bistatic passive radar system and the host transmitter from the determined values of $\theta$, $R_a$, and B. The apparatus for determining the angle B includes a directional antenna and a synchro system. The apparatus for determining the distance between the bistatic passive radar system and the host transmitter includes apparatus for generating on the display a B cursor which emanates from the position of the bistatic passive radar system on the display and points in the direction that the directional antenna points. The system further includes apparatus for varying the distance D on the display between the bistatic passive radar system and the host transmitter. The system includes a bistatic correction circuit for determining the correct range for display of a selected target from the displaced position of the host transmitter from the determined values of $\theta$, $R_a$ and D; wherein the apparatus for manually varying the distance D on the display also varies the value of the distance D that is used by the bistatic correction circuit in determining such correct range. FIG. 1 shows the geometric relationship between a bistatic passive radar receiver $R_x$, its host transmitter $T_x$, and a selected target T. The pulses of electromagnetic energy from the host transmitter $T_x$ travel to the receiver $R_x$ over the line D and travel to the target T over the line $R_c$. The reflected pulses from the target T travel to the receiver $R_x$ over line C. Therefore, at the receiver, the time delay between receipt of the transmitter pulse and the target pulse is $t_d = t[R_c^* + C] - t[D]$. The apparent range $R_a$ of the target T is thus:

$$R_a = [R_c^* + C - D] \qquad \text{Equation \#1}$$

The range $R_c^*$ of the target T is:

$$R_c^* = \frac{R_a^2 + 2R_a D}{2R_a + 2D(1 + \cos\phi)} \qquad \text{Equation \#2}$$

However, since $R_c^*$ represents only the passage of the pulse to the target without return, the display range, $R_c$, which includes the return trip will be:

$$R_c = 2R_c^*, \text{ and} \qquad \text{Equation \#3}$$

$$R_c = \frac{R_a^2 + 2R_a D}{R_a + D(1 + \cos\phi)} \quad \text{Equation \#4}$$

Equation number 4 is the bistatic range correction equation and must be implemented for all targets to have the correct range of the targets on the display. This correction equation was implemented in the prior art bistatic passive radar displays on the basis of measurement of the apparent range $R_a$, a computation of the angle $\emptyset$, and an estimate for the distance D between the host transmitter $T_x$ and the bistatic passive receiver $R_x$. However, as discussed previously, the estimate for D can be very inaccurate in deep ocean situations where there are no landmarks, and the principal object of this invention is to provide a means of determining the distance D accurately without landmarks.

Solving the triangle of FIG. 1 for D in terms of B, $\emptyset$, and $R_a$ yields:

$$D = \frac{R_a \sin(\phi - B)}{\sin B + \sin\phi - \sin(\phi - B)} \quad \text{Equation \#5}$$

Thus D may be determined if B is determined, $R_a$ is determined, and $\emptyset$ is computed. $R_a$ was measured, and $\emptyset$ was computed in the prior art bistatic passive radar systems. The present invention adds the capability of determining the angle B and determining the distance D empirically by utilizing the B cursor which emanates from the position of the receiver $R_x$ on the display (FIG. 2) and points in the direction that the directional antenna points. Additional features of the invention are discussed in relation to the description of the preferred embodiment.

DESCRIPTION OF THE PREFERRED EMBODIMENTS

Figure 3:
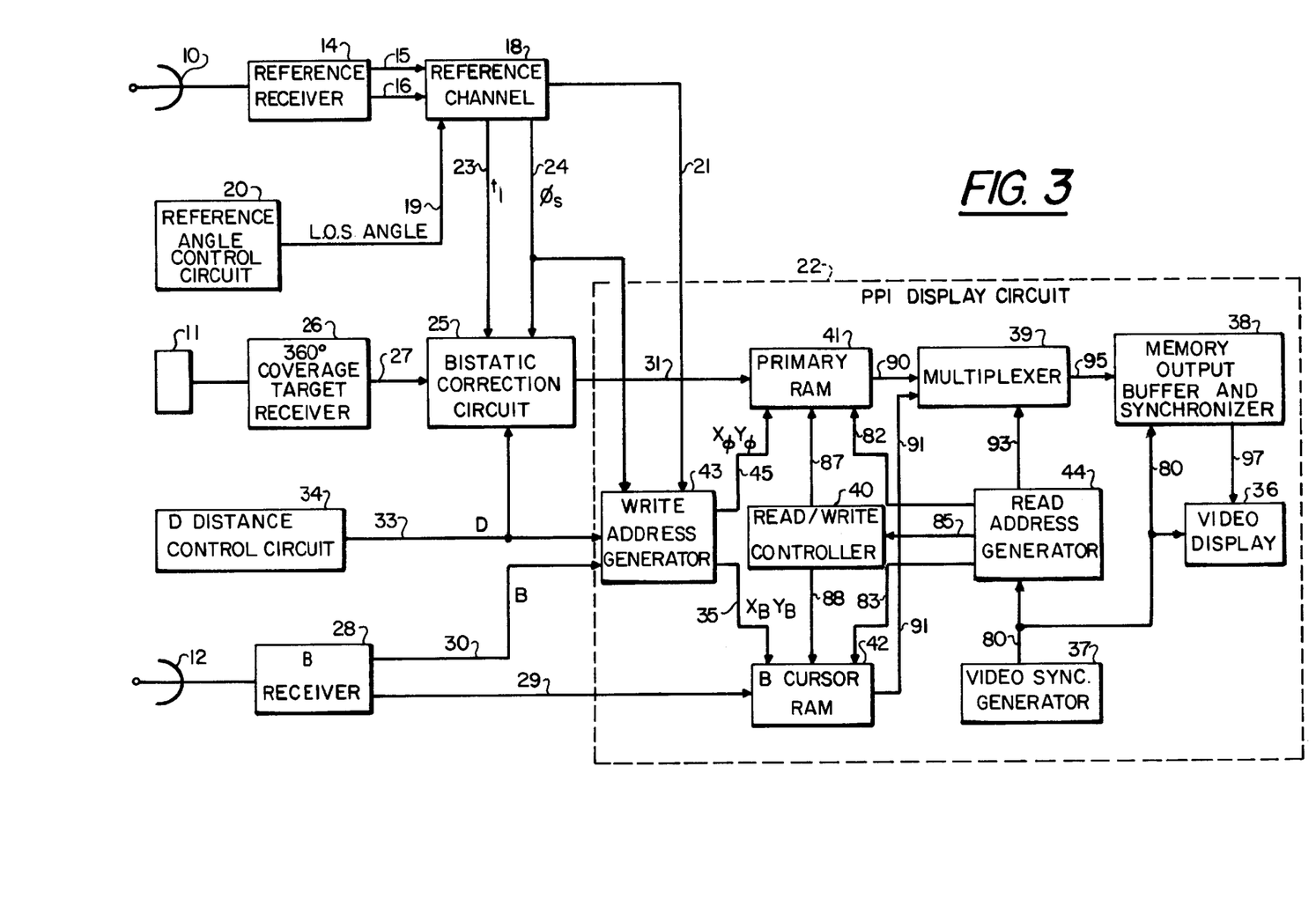
FIG. 3 is a functional block diagram of a preferred embodiment of the system of the present invention.

The preferred embodiment of the system of the present invention, as shown in FIG. 3, includes three antennas located at position $R_x$ (in FIG. 1). They are a first directional antenna 10, an omnidirectional antenna 11 and a second directional antenna 12.

The first directional antenna 10 is directed toward the host transmitter located at position $T_x$ for receiving the radar pulses transmitted by the host transmitter. A reference receiver 14 is coupled to the first directional antenna 10. The reference receiver 14 includes a video amplifier for providing a video signal on line 15 in response to the radar pulses received by the antenna 10. The reference receiver 14 further includes a synchro system for providing a signal on line 16 that indicates the azimuth angle of the antenna 10 in relation to North.

The signals on lines 15 and 16 are provided to a reference channel 18 in combination with a L.O.S. angle signal that is provided on line 19 from a reference angle control circuit 20 for indicating the azimuth angle of the line of sight between the bistatic passive radar system and the host transmitter in relation to North.

The reference channel 18 contains conventional circuitry for responding to the signals on lines 15, 16 and 19 to provide a range sweep trigger signal on line 21 to a PPI display circuit 22; and to provide a periodic transmitter sweep rate time base signal $t_1$ on line 23 and a $\emptyset_s$ signal representative of the azimuth angle $\emptyset$ at which the host transmitter is directed on line 24 to a bistatic range correction circuit 25. The azimuth angle $\emptyset$, as shown in FIG. 1, is the azimuth angle between the extension of a line extending from the position of the radar system through the host transmitter and a line extending from the host transmitter to the selected target. The $\emptyset_s$ signal on line 24 is also provided to the PPI display circuit 22.

The reference channel 18 includes a pulse repetition interval (PRI) generator for generating the time base signal $t_1$ on line 23. The range sweep trigger signal on line 21 and the time base signal $t_1$ on line 23 are synchronous with the direct path radar pulses from the host transmitter that are indicated by the video signal on line 15. The $\emptyset_s$ signal on line 24 is generated by the reference channel 18 in response to observing the passage of the main beam of the radar pulses from the host transmitter (as indicated by the video signal on line 15) on successive scan rotations of the host transmitter and measuring the interval between successive passages of the main beam to thereby provide an azimuth sweep trigger signal which indicates the zero degree $\emptyset$ azimuth angle of the main beam and thereby is synchronous with the azimuth rotation rate of the host transmitter. In response to the azimuth sweep trigger signal, the $\emptyset_s$ signal on line 24 is generated to indicate changing values of $\emptyset$ over a range of 360 degrees between successive azimuth sweep trigger signals. The $\emptyset_s$ angle indicated by the $\emptyset_s$ signal on line 24 thereby is synchronized with the scan rotation azimuth angle of the host transmitter. The $\emptyset_s$ angle indicated by the $\emptyset_s$ signal on line 24 when the main beam of the radar pulses from the host transmitter is along the line of sight between the bistatic passive radar system at $R_x$ and the host transmitter at $T_x$ is offset from zero degrees by the same angle that the line of sight is offset from North, as indicated by the L.O.S. angle signal on line 19. Using the reference control circuit 20, the L.O.S. angle signal on line 19 can be manually varied in relation to the azimuth angle signal received on line 16 so that the top of the display corresponds to North.

A 360° coverage target receiver 26 is coupled to the omnidirectional antenna 11. The receiver 26 includes a video amplifier for providing a video signal on line 27 to the bistatic correction circuit 25 in response to radar pulses received by the omnidirectional antenna 11 either directly from the host transmitter or as reflected from targets of opportunity as the main beam of pulses from the host transmitter is being swept over the area within the range of the bistatic passive radar system.

A B receiver 28 is coupled to the second directional antenna 12. The second directional antenna 12 is directed toward a selected target T. The B receiver 28 includes a video amplifier for providing a video signal on line 29 to the PPI display circuit 22 in response to radar pulses reflected from the selected target T. The B receiver 28 further includes a synchro system for determining the azimuth angle of the second directional antenna 12. The synchro system provides a B angle signal on line 30 to the PPI display circuit 22 for indicating the azimuth angle B between the line of sight from the position of the radar system $R_x$ to the position of the host transmitter $T_x$ and a line extending from the radar system to the selected target (see FIG. 1).

The video signal on line 27 is provided to the bistatic range correction circuit 25. The bistatic range correction circuit 25 computes a corrected range $R_c$ from the host transmitter to each target that reflects a radar pulse to the omnidirectional antenna 11 and provides target video signals on line 31 to the PPI display circuit 22 that are delayed in accordance with the computation of $R_c$ for causing a video image of each such target to be displayed at a position representative of the corresponding corrected range $R_c$. The video signals on lines 19 and 31 are combined by the PPI display circuit to intensify the video image of the selected target at which the second directional antenna 12 is pointed.

The bistatic range correction circuit 27 computes the corrected range $R_c$ in accordance with Equation #4 derived hereinabove.

$$R_c = \frac{R_a^2 + 2R_a D}{R_a + D[1 + \cos\phi]} \qquad \text{Equation \#4}$$

The apparent range $R_a$ is determined by measuring the time of arrival of the respective reflected radar pulses received by the omnidirectional antenna 11 as indicated by the video signal on line 27 in relation to the periodic transmitter sweep rate time base signal $t_1$ on line 23. The azimuth angle $\emptyset$ is indicated by the $\emptyset_s$ signal on line 24.

The distance D between the bistatic passive radar system and the host transmitter is indicated to the bistatic range correction circuit 25 by a D signal on line 33 from a manually adjustable distance D control circuit 34.

A bistatic range correction circuit for computing the corrected range $R_c$ is described in U.S. Letters Pat. No. 4,281,327 to Lawrence M. Frazier and William H. Johnson, the disclosure of which is incorporated herein by reference thereto.

The distance D control 34 is coupled to the PPI display circuit 22 and is used in conjunction therewith for determining the distance D from the bistatic passive radar system to the host transmitter.

The PPI display circuit 22 includes a video display 36, a video sync generator 37, a memory output buffer and synchronizer 38, a multiplexer 39, a read/write controller 40, a primary random access memory (RAM) 41, a B cursor RAM 42, a write address generator 43, and a read address generator 44.

The target video signals on line 31 are stored in the primary RAM 41, and the B cursor video signal on line 29 is stored in the B cursor RAM 42. Although the target video signals on line 31 and the B cursor video signal on line 29 are produced in accordance with a polar coordinate matrix, they are stored in a rectangular coordinate matrix so that they can be retrieved by a video raster scan.

Figure 2:
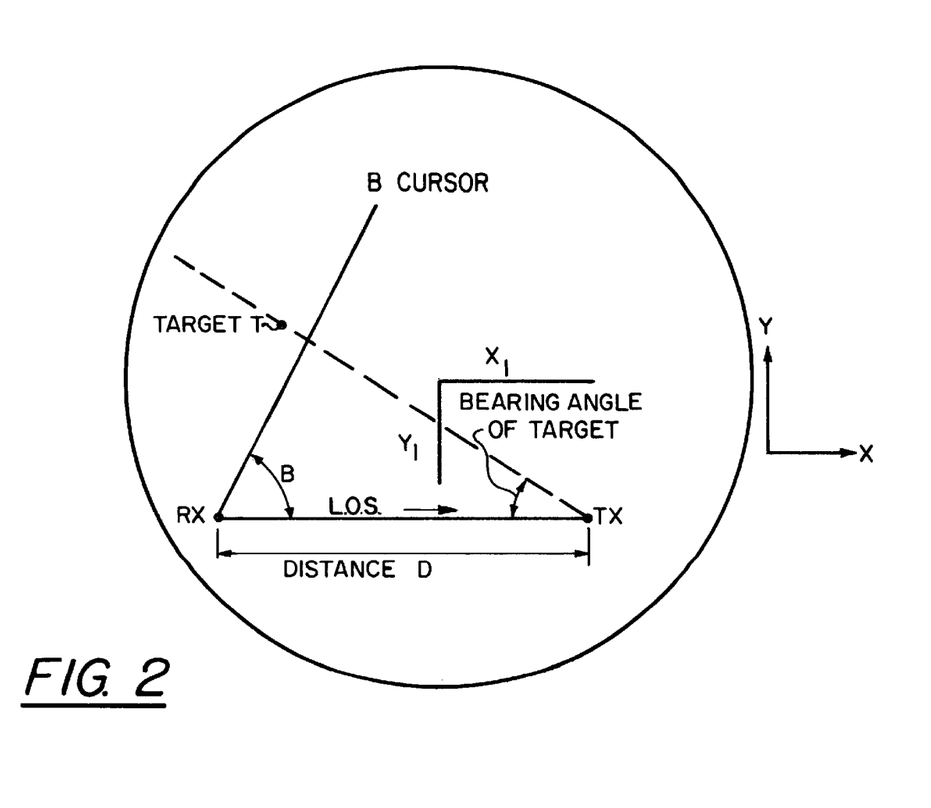
FIG. 2 shows the positions of the bistatic passive radar system, the host transmitter, a selected target and the B cursor on the display of the system.

The write address generator 43 generates address coordinate signals $X_B$=R Cos B+$X_1$+D and $Y_B$=R Sin B+Y, on lines 35 b for writing the B cursor video signal from line 29 in the B cursor RAM 42. R is the dynamic sweep range (or length) of the B cursor video signal. B is the azimuth angle B between the line of sight to the host transmitter and a line from the bistatic passive radar system to the selected target. D is the distance from the bistatic passive radar system to the host transmitter. $X_1$ and $Y_1$ are the offset coordinates of the location of $T_x$ of the host transmitter on the video display 36, as shown in FIG. 2.

The write address generator 43 also generates address coordinate signals $X_\emptyset$=R Sin $\emptyset_s$+$X_1$ and $Y_\emptyset$=R Cos $\emptyset_s$+$Y_1$ on lines 45 for writing the target video signals from line 31 in the primary RAM 41. R is the dynamic sweep range of the target video signals. $\emptyset_s$ is the $\emptyset_s$ angle indicated by the $\emptyset_s$ signal on line 24, as described above. $X_1$ and $Y_1$ are the offset coordinates of the location $T_x$ of the host transmitter on the video display 36 as shown in FIG. 2.

Figure 4:
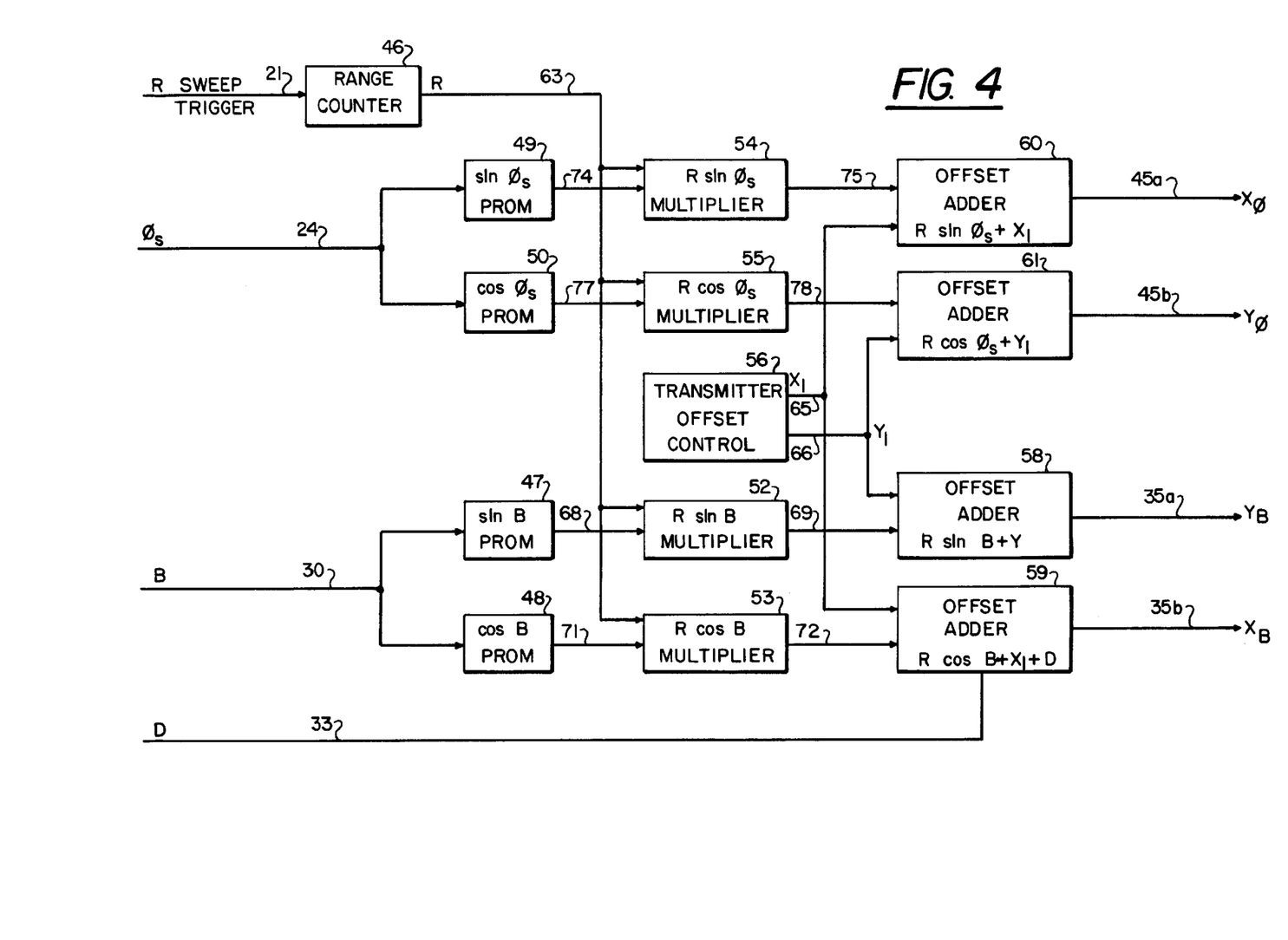
FIG. 4 is a functional block diagram of the write address generator in the system of FIG. 3.

Referring to FIG. 4, the write address generator 41 includes a range counter 46, a Sin B programmable read only memory (PROM) 47, a Cos B PROM 48, a Sin $\emptyset_s$ PROM 49, a Cos $\emptyset_s$ PROM 50, a first multiplier 52, a second multiplier 53, a third multiplier 54, a fourth multiplier 52, a transmitter offset control 56, a first offset adder 58, a second offset adder 59, a third offset adder 60 and a fourth offset adder 61.

The range counter 46 is responsive to the dynamic display range sweep trigger signal on line 21 for providing a range signal R on line 63 that is representative of the dynamic value of R. The count rate of the range counter 46 may be manually varied by the operator to thereby vary the range scale of the video image of the targets displayed on the video display 36. The range signal R on line 63 is a linear digital ramp signal. The range counter 46 is reset to zero in response to each range sweep trigger signal on line 21. The range sweep trigger on line 21 is synchronized with the radar pulses from the host transmitter. Therefore, the range signal R on line 63 is proportional to the range from the host transmitter to the respective targets for whatever range scale has been chosen by the operator.

Figure 5:
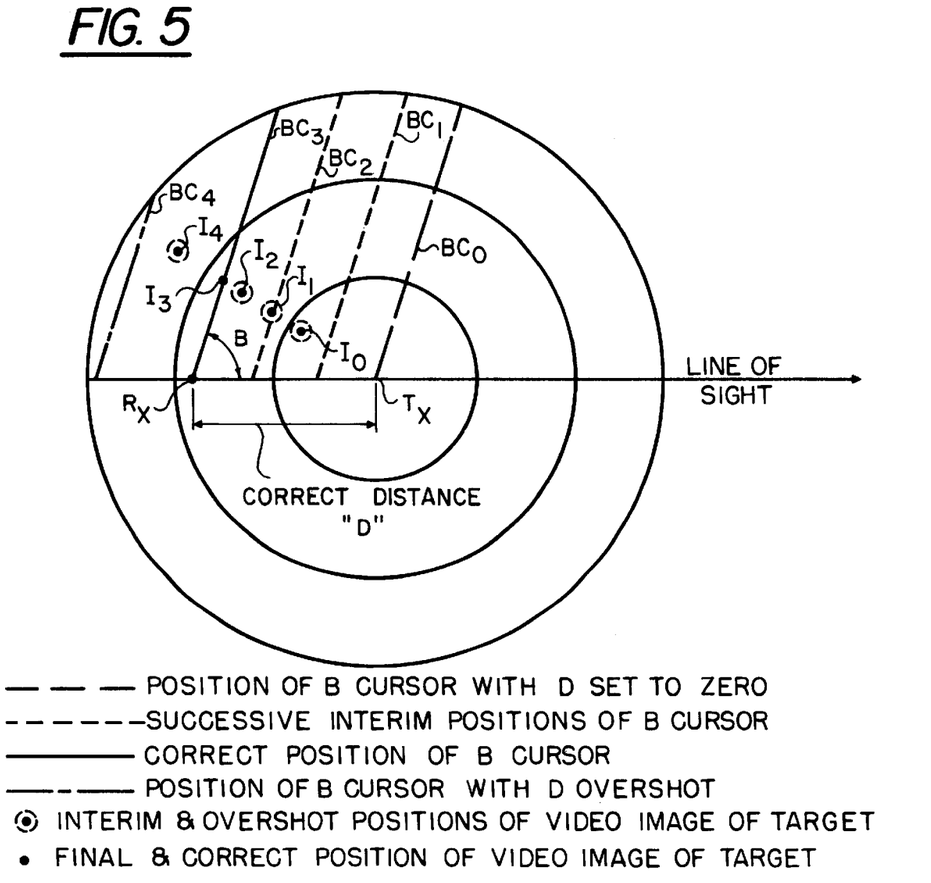
FIG. 5 illustrates how the B cursor is used in varying the distance D on the display in order to emprically determine the correct range to the selected target from the host transmitter.

The transmitter offset control 56 is manually varied by the operator to provide offset coordinate signals $X_1$ and $Y_1$, on lines 65 and 66 respectively. The values $X_1$ and $Y_1$, preferably are chosen so that the position $T_x$ of the host transmitter is centered in the video display 36, as shown in FIG. 5.

The Sin B PROM 47 has Sin B stored therein and responds to the B signal from line 30 by providing a signal on line 68 that is representative of Sin B. The first multiplier 52 processes the range signal R from line 63 and the Sin B signal from line 68 to provide a first multiplier output signal on line 69 that is representative of R Sin B. The first offset adder 58 adds the first multiplier output signal from line 69 to the offset coordinate signal $Y_1$ from line 66 to provide the $Y_B$ address coordinate signal on line 35a to the B cursor RAM 42.

The Cos B PROM 48 has Cos B stored therein and responds to the B signal from line 30 by providing a signal on line 71 that is representative of Cos B. The second multiplier 53 processes the range signal R from line 63 and the Cos B signal from line 71 to provide a second multiplier output signal on line 72 that is representative of R Cos B. The second offset adder 59 adds the second multiplier output signal from line 72 to the offset coordinate signal $X_1$ from line 65 and the D distance signal from line 33 to provide the $X_B$ address coordinate signal on line 35b to the B cursor RAM 42.

The Sin $\emptyset_s$ PROM 49 has Sin $\emptyset_s$ stored therein and responds to the $\emptyset_s$ signal from line 24 by providing a signal on line 74 that is representative of Sin $\emptyset_s$. The third multiplier 54 processes the range signal R from line 63 and the Sin $\emptyset_s$ signal from line 74 to provide a third multiplier output signal on line 75 that is representative of R Sin $\emptyset_s$. The third offset adder 60 adds the third multiplier output signal from line 75 to the offset coordinate signal $X_1$ from line 65 to provide the $X_\emptyset$ address coordinate signal on line 45a to the primary RAM 41. The Cos $\emptyset_s$ PROM 50 has Cos $\emptyset_s$ stored therein and responds to $\theta_s$ from line 24 by providing a signal on line 77 that is representative of Cos $\theta_s$. The fourth multiplier 55 processes the range signal R from line 63 and the Cos $\theta_s$ signal from line 77 to provide a fourth multiplier output signal on line 78 that is representative of R Cos $\theta_s$. The fourth offset adder 61 adds the fourth multiplier output signal from line 78 to the offset coordinate signal $Y_1$ from line 66 to provide the $Y_0$ address coordinate signal on line 45b to the primary RAM 41.

Referring again to FIG. 3, the video sync generator 37 is a standard NTSC television sync generator for generating video sync signals on lines 80 to the video display 36, the memory output buffer and synchronizer 38 and the read address generator 44.

The read address generator 44 includes a horizontal address counter and a vertical address counter. The horizontal address counter responds to the video sync signals from line 80 by dividing each horizontal line of a typical television display into a predetermined number of horizontal address positions, and by providing an incremental count for indicating each horizontal address position. The vertical address counter responds to the video sync signals by providing an incremental count of the lines. The horizontal and vertical counters respectively provide horizontal and vertical read address signals on lines 82 for reading target video signals from the primary RAM 41 and on lines 83 for reading the B cursor video signal from the B cursor RAM 42.

The read address generator 44 further provides a control signal on line 85 to the read/write controller for synchronizing the read/write controller 40 so that it completes a write/read cycle during each horizontal address position count. The read/write controller 40 provides read/write control signals on line 87 to the primary RAM 41 and on line 88 to the B cursor RAM 42.

During the write portion of each read/write cycle as indicated by the read/write control signal on line 87, the target video signal on line 31 is stored in the primary RAM 41 at the storage location indicated by the $X_0$ and $Y_0$ address coordinate signals then being provided on lines 45 from the write address generator 43. During the read portion of each read/write cycle as indicated by the read/write control signal on line 87, a target video signal is read out of the storage location in the primary RAM 41 indicated by the horizontal and vertical address signals then being provided on lines 82 from the read address generator 44. Target video signals read out of the primary RAM 41 are provided on line 90 to the multiplexer 39.

During the write portion of each read write cycle as indicated by the read/write control signal on line 88, the video signal on line 29 is stored in the B cursor RAM 42 at the storage location indicated by the $X_B$ and $Y_B$ address coordinate signals then being provided on lines 35 from the write address generator 43. During the read portion of each read/write cycle as indicated by the read/write control signal on line 88, a video signal is read out of the storage location in the B cursor RAM indicated by the horizontal and vertical address signals then being provided on lines 83 from the read address generator 44. Video signals read out of the B cursor RAM 42 are provided on line 91 to the multiplexer 39.

The read address generator 44 provides a multiplexer control signal on line 93 to the multiplexer 39 for causing the multiplexer 39 to multiplex the target video signals on line 90 and the video signal on line 91 during each read write cycle to provide a time-shared composite video signal on line 95 to the memory output buffer and synchronizing 38. Preferably, the read/write control signal on line 87 complements the read/write control signal on line 88 so that target video signals are read out of the primary RAM 41 onto line 90 while the video signal from line 29 is being stored in the B cursor RAM 42, and so that the video signal is read out of the B cursor RAM 42, onto line 91 while the target video signals are being stored in the primary RAM 41.

The read and write portions of each read/write cycle are of equal duration in this embodiment.

The time-shared composite video signal on line 95 is buffered by the memory output buffer and synchronizer 38 and provided to the video display 36 in response to the video sync signals provided on line 80 by the video sync generator 37. The video sync signals on line 80 are also provided to the video display 36 to provide a synchronized composite video images of targets represented by the target video signals read out of the primary RAM 41 onto line 90 and of the B cursor represented by the video signal read out of the B cursor RAM 42 onto line 91.

Determination of the distance D is accomplished as follows.

The second direction antenna 12 is directed to a selected stationary ground target. The PPI display circuit 22 responds to the video signal on line 29, the B angle signal on line 30 and the D distance signal on line 33 by causing a B cursor to be displayed on the video display 36 at the angle B from the line extending between the displayed positions of the radar system $R_x$ and the host transmitter $T_x$ as shown in FIG. 2. In FIG. 5, the displayed position $T_x$ of the host transmitter is the center of the video display 36. The displayed position $R_x$ of the radar system is dependent on the value of D that is indicated by the D signal provided on line 33 by the manually adjustable distance D control 34.

FIG. 5 shows B cursors $BC_0$, $BC_2$, $BC_1$, $BC_3$ and $BC_4$, at different positions on the video display 36 in accordance with different values of D indicated by the D signal on line 33, and further shows video images $I_0$, $I_1$, $I_2$, $I_3$, and $I_4$ of the selected ground target at different positions on the video display 36 in accordance with different values of corrected horizontal range $R_c$ computed by the bistatic range correction circuit 25 in response to the corresponding different values of D indicated by the D signal on line 33.

B cursor $BC_0$ and video image $I_0$ are displayed simultaneously on the video display 36 when the D signal on line 33 indicates zero distance between the positions of the radar system $R_x$ and the host transmitter $T_x$. Corresponding simultaneous displays of the B cursor and the video image of the selected target on the video display 36 are designated by common subscripts in FIG. 5.

The B cursor bisects the video image of the selected target T only when the correct value of D is indicated by the D signal on line 33.

When the value of D indicated by the D signal on line 33 is less than the correct distance D, the video image of the selected target is displayed to the left of the B cursor; and when the value of D indicated by the D signal on line 33 overshoots (exceeds) the correct distance D, the video image of the selected target is displayed to the right of the B cursor. In FIG. 5, B cursor and video image pairs $BC_1$ and $I_1$ and $BC_2$ and $I_2$ illustrate interim displayed positions between where the D signal on line 33 indicates zero distance and the correct distance D. B cursor and video image pair $BC_3$ and $I_3$ illustrate the displayed positions when the D signal indicates the correct distance D. B cursor and video image pair $BC_4$ and $I_4$ illustrate an overshot displayed positions where the D signal on line 33 indicates a value of D in excess of the correct distance D.

Thus the correct distance D between the bistatic passive radar system $R_x$ and the host transmitter $T_x$ can readily be determined by manually adjusting the distance D control 34 to vary the D signal on line 33 until the B cursor bisects the video image of the selected stationary ground target on video display 36. This procedure preferably is repeated with several such targets to refine the determination. The correct value of D determined by this procedure is indicated by the D signal on line 33 and is used by the bistatic range correction circuit 25 in computing the corrected horizontal range $R_c$.

The system of the present invention is applicable for all targets and receivers that lie in the plane of rotation of the host radar.

What is claimed is:

1. A bistatic passive radar system which is used in conjunction with a host transmitter, and which includes a display and means for determining azimuth angle $\emptyset$ between the extension of the line of sight to the host transmitter and a line extending from the host transmitter to a selected target, and also includes means for determining the apparent range $R_a$ of the selected target, characterized by means for determining the angle B between the line of sight to the host transmitter and a line extending from the bistatic passive radar system to the selected target; and means for determining the distance between the bistatic passive radar system and the host transmitter from the determined values of $\emptyset$, $R_a$ and B.

2. A system according to claim 1, wherein the means for determining the angle B includes a directional antenna and a syncro system.

3. A system according to claim 2, wherein the means for determining the distance between the bistatic passive radar system and the host transmitter includes means for generating on the display a B cursor which emanates from the position of the bistatic passive radar system on the display and points in the direction that the directional antenna points.

4. A system according to claim 3, further including means for varying the distance D on the display between the bistatic passive radar system and the host transmitter.

5. A system according to claim 4, further including a bistatic correction circuit for determining the correct range for display of a selected target from the host transmitter from the determined values of $\emptyset$, $R_a$ and D; wherein the means for varying the distance D on the display also varies the value of the distance D that is used by the bistatic correction circuit in determining said correct range.

6. A system according to claims 3 or 5, wherein the means for generating a B cursor comprises a random access memory (RAM); means for writing a video signal corresponding to the B cursor in the RAM; and means for reading said video signal out of the RAM and providing it to the display.

7. A system according to claim 6, wherein the means for writing said video signal in the RAM comprises a read/write controller;

means for synchronizing the read/write controller with the display; and means for generating address coordinates signals $X_B$=R Cos B+X, +D and $Y_b$=R Sin B+$Y_1$ for writing said video signal in the RAM, wherein R is the dynamic sweep range of said video signal and $X_1$ and $Y_1$ are offset coordinates of the location of the host transmitter on the display.

8. A system according to claim 7, wherein the means for generating the address coordinate signal R Cos B+$X_1$+D includes a range counter for providing a range signal representative of the dynamic value of R;

a programmable read only memory (PROM) having Cos B stored therein and coupled to the means for determining the angle B for providing a PROM output signal representative of Cos B;

a multiplier coupled to the range counter and the PROM for processing the range signal and the PROM output signal to provide a multiplier output signal representative of R Cos B; and an adder for adding the multiplier output signal to a signal representative of $X_1$ and to a signal representative of D.

9. A system according to claim 7 wherein the means for generating the address coordinate signal R Sin B+$Y_1$ includes a digital range counter for providing a range signal representative of the dynamic value of R;

a programmable read only memory (PROM) having Sin B stored therein and coupled to the means for determining B for providing a PROM output signal representative of Sin B;

a multiplier coupled to the range counter and the PROM for processing the range signal and the PROM output signal to provide a multiplier output signal representative of R Sin B; and an adder for adding the multiplier output signal to a signal representative of $Y_1$.

10. A system according to claim 6, wherein the means for reading said video signal out of the RAM comprises a read/write controller;

means for synchronizing the read/write controller with the display;

means coupled to the read/write controller and the synchronizing means for addressing the RAM in a raster scan pattern to read said video signal out of the RAM; and means coupled to the synchronizing mean for buffering said read-out video signal and synchronizing the provision thereof to the display.

11. A system according to claim 6, including an omnidirectional antenna for receiving reflected radar pulses from targets at any bearing, means responsive to said received pulses for providing target video signals and means responsive to said target video signal for providing images of said targets on the display, and further comprising a second RAM;

means for writing said target video signals in the second RAM; and means for reading said target video signals out of the second RAM and providing them to the display.

12. A system according to claim 11, further comprising means for causing the display to time share said read-out video signal corresponding to the B cursor with said read-out target video signals.

13. A system according to claim 11, including a second directional antenna for directing at the host transmitter for receiving radar pulses transmitted by the host transmitter and means coupled to the second directional antenna for determining the angular scan rate of the host transmitter and for responding thereto by providing a dynamic display range sweep trigger signal and a $\emptyset_s$ signal representative of the azimuth angle $\emptyset_s$ at which the host transmitter is directed over an angular scan of 360 degrees, wherein the means for writing said target video signals in the second RAM comprises.

a read/write controller;
means for synchronizing the read/write controller with the display; and
means responsive to the dynamic display range sweep trigger signal and the $\emptyset_s$ signal for generating address coordinates signals $X_\emptyset = R \sin \emptyset_s + X_1$ and $Y_\emptyset = R \cos \emptyset + Y_1$ for writing said target video signals in the second RAM, wherein R is the dynamic sweep range of said target video signals and $X_1$ and $Y_1$ are offset coordinates of the location of the host transmitter on the display.

14. A system according to claim 13, wherein the means for generating the address coordinate signal $R \sin \emptyset_s + X_1$ includes a range counter responsive to the dynamic display range sweep trigger signal for providing a range signal representative of the dynamic value of R;
a programmable read only memory (PROM) having Sin $\emptyset_s$ stored therein and responsive to the $\emptyset_s$ signal for providing a PROM output signal representative of Sin $\emptyset_s$;
a multiplier coupled to the range counter and the PROM for processing the range signal and PROM output signal to provide a multiplier output signal representative of R Sin $\emptyset_s$; and
an adder for adding the multiplier output signal to a signal representative of $X_1$.

15. A system according to claim 13, wherein the means for generating the address coordinate signal $R \cos \emptyset_s + Y_1$ includes a range counter responsive to the dynamic display range sweep trigger signal for providing a range signal representative of the dynamic value of R;
a programmable ready only memory (PROM) having Cos $\emptyset_s$ stored therein and responsive to the $\emptyset_s$ signal for providing a PROM output signal representative of Cos $\emptyset_s$;
a multiplier coupled to the range counter and the PROM for processing the range signal and the PROM output signal to provide multiplier output signal representative of R Cos $\emptyset_s$; and
an adder for adding the multiplier output signal to a signal representative of $Y_1$.

16. A system according to claim 13, wherein the means for reading said target video signals out of the second RAM comprises means coupled to the read/write controller and the synchronizing means for addressing the second RAM in a raster scan pattern to read said target video signals out of the second RAM; and
means coupled to the synchronizing means for buffering said read-out target video signals and synchronizing the provision thereof to the display.

17. A system according to claim 11 wherein the means for reading said target video signals out of the second RAM comprises a read/write controller;
means for synchronizing the read/write controller with the display;
means coupled to the read/write controller and the synchronizing means for addressing the second RAM in a raster scan pattern to read said target video signals out of the second RAM; and
means coupled to the synchronizing means for buffering said read-out target video signals and synchronizing the provision thereof to the display.

* * * * *